Oct. 28, 1958  G. F. KELK ET AL  2,858,104
ADJUSTABLE GAS TURBINE SHROUD RING SEGMENTS
Filed Feb. 4, 1954  3 Sheets-Sheet 1
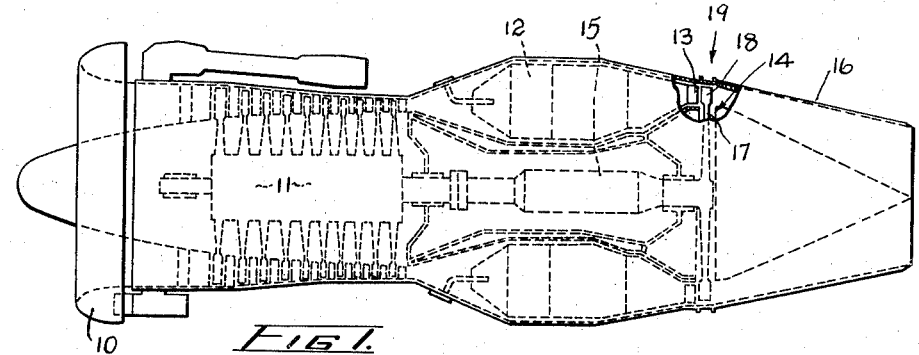
Fig. 1.
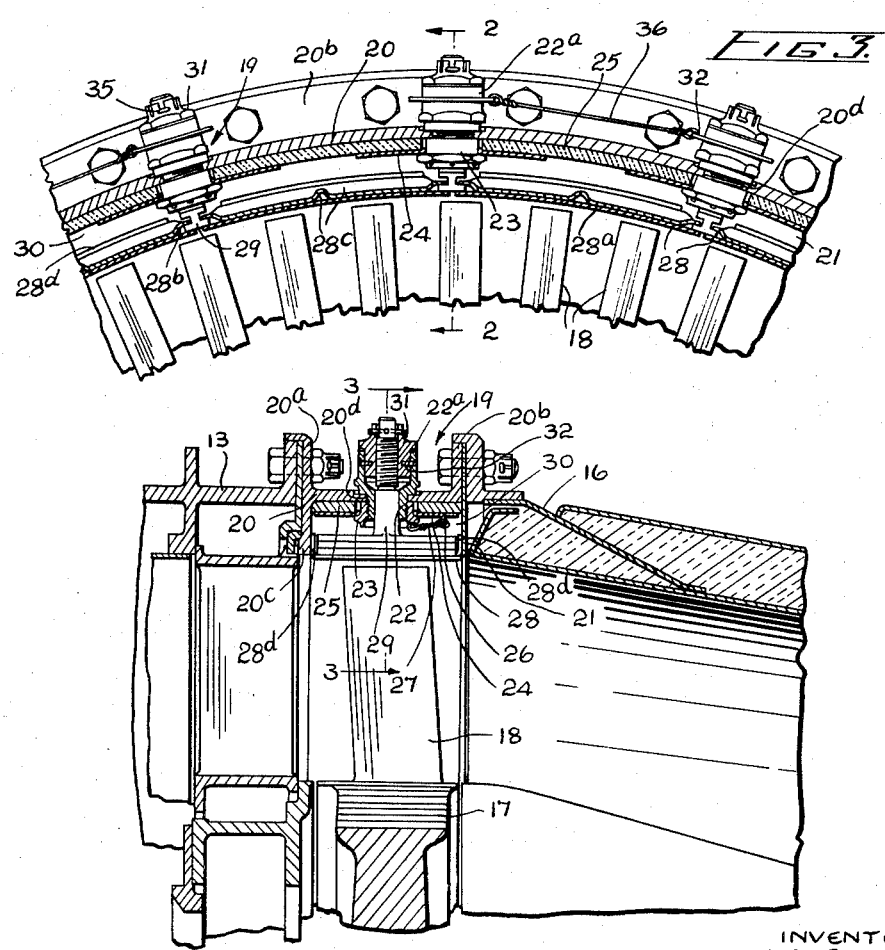
Fig. 3.
Fig. 2.
INVENTORS
N. KLOMPAS
G. F. KELK
BY
Maybee & Legris
ATTORNEYS.

Oct. 28, 1958 G. F. KELK ET AL 2,858,104
ADJUSTABLE GAS TURBINE SHROUD RING SEGMENTS
Filed Feb. 4, 1954 3 Sheets-Sheet 2

INVENTORS
N. KLOMPAS
G. F. KELK
BY
Maybee & Legris
ATTORNEYS.

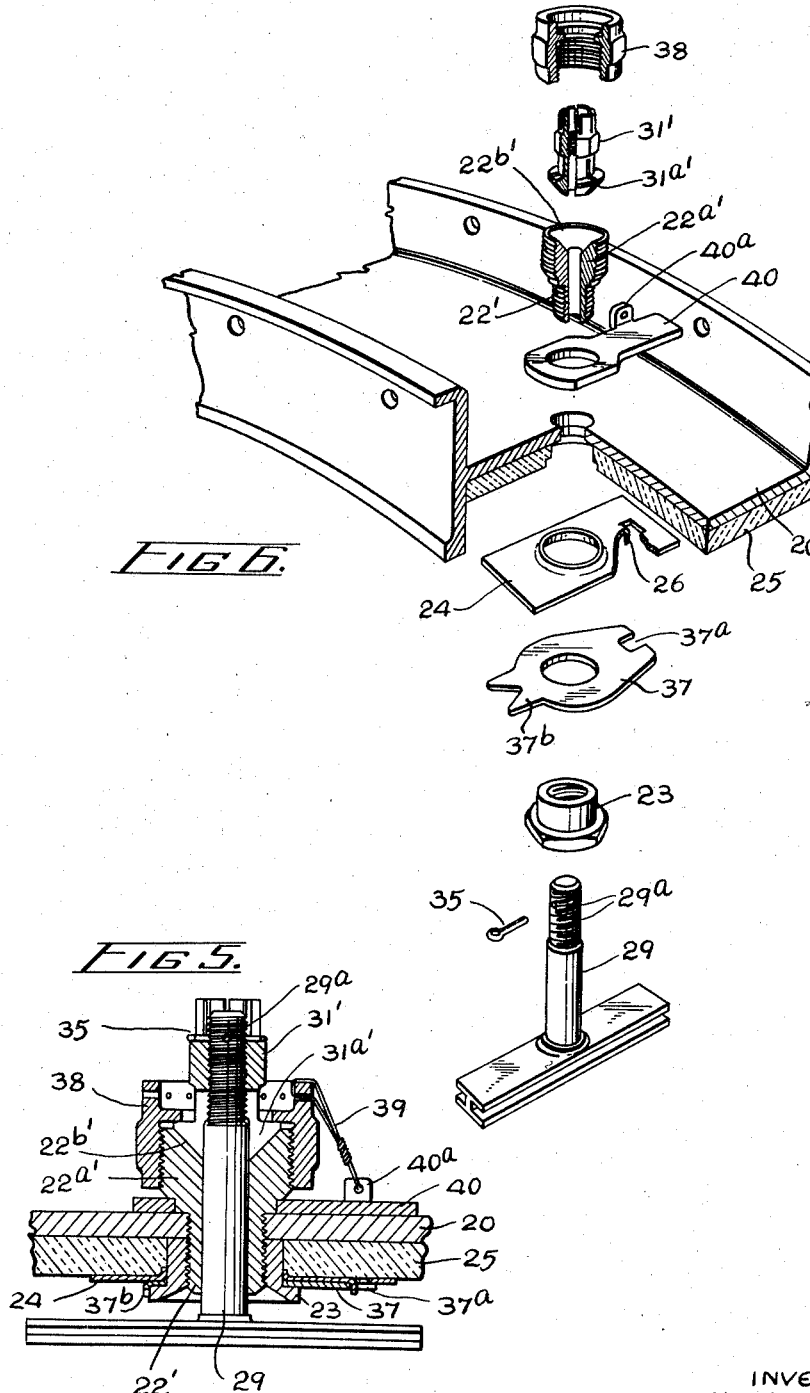

United States Patent Office 2,858,104
Patented Oct. 28, 1958

2,858,104

ADJUSTABLE GAS TURBINE SHROUD RING SEGMENTS

George Frederick Kelk, York Mills, Ontario, and Nicholas Klompas, Beverley Hills, Ontario, Canada, assignors to A. V. Roe, Canada, Limited, Malton, Ontario, Canada, a corporation Application February 4, 1954, Serial No. 408,136

9 Claims. (Cl. 253—78)

This invention relates to stator ring assemblies for rotary machines, and in particular to shroud rings in gas turbine engines.

In gas turbine engines it is customary to make shroud rings in one piece or by rigidly connecting two or more segments. In both cases the standard of machining has to be very high in order to obtain concentricity and minimum clearance between the rotor blades and shroud ring, which conditions are necessary to obtain the best possible efficiency in operation. It has been found by experience that such conventional rings are subject to distortion and warpage in the course of operation. These undesirable effects may be due to local differences of temperature, uneven stresses, or engine vibration.

It is the object of this invention to provide a construction for shroud rings and the like in which distortion and warpage can be overcome or minimized and in which any distortion or warpage which does occur can be substantially eliminated by simple adjustment. Other objects and advantages of the invention will be apparent from the following description of two embodiments thereof.

In the accompanying drawings, forming a part of this specification and in which like reference characters are used to designate like parts throughout:

Fig. 1 is a side elevation of a gas turbine jet engine, partly in section to show a portion of the turbine rotor and shroud ring assembly;

Fig. 2 is an enlarged fragmentary section taken along a plane passing through the longitudinal axis of said engine and also showing said portion of the turbine rotor and shroud ring assembly and is also a section taken on the plane 2—2 of Fig. 3;

Fig. 3 is a transverse section taken on the plane 3—3 of Fig. 2;

Fig. 5 is a view similar to Fig. 2 and showing an alternative construction; and

Fig. 6 is an exploded perspective view of parts of the assembly shown in Fig. 5.

Figure 4:
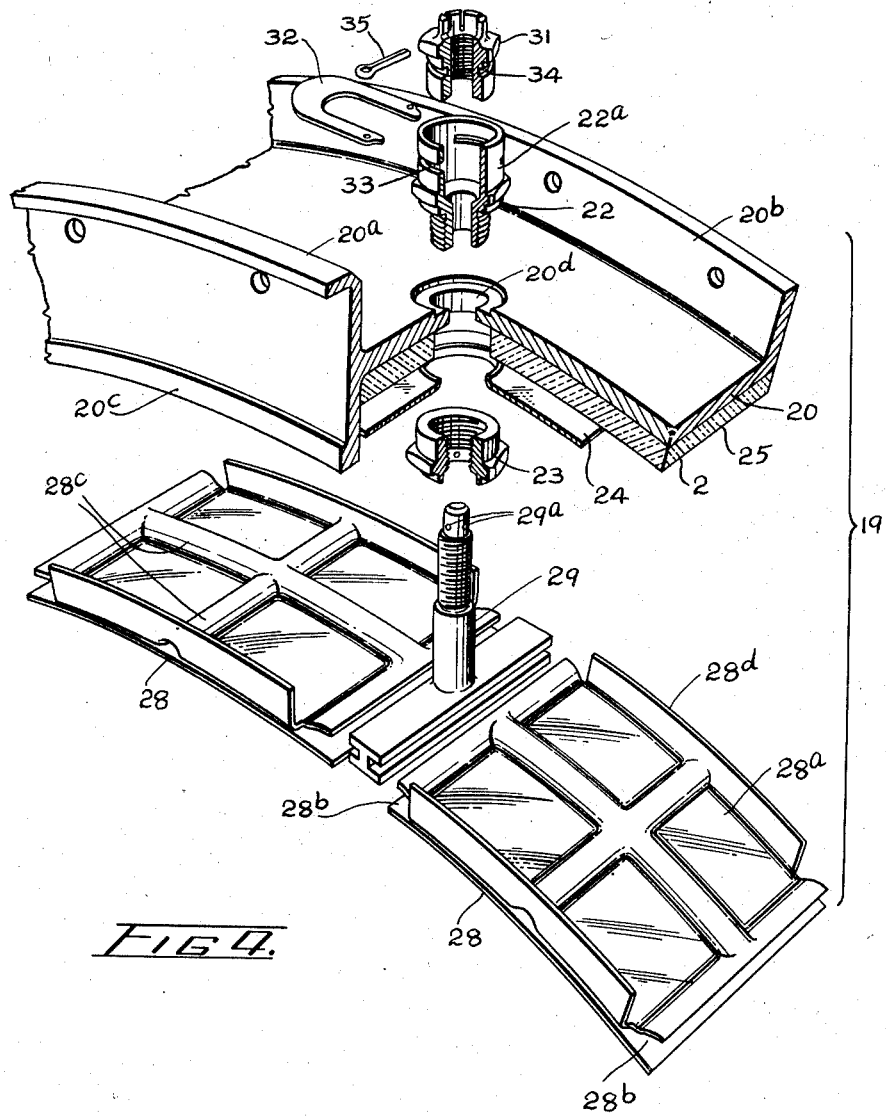
Fig. 4 is an exploded perspective view of parts of the shroud ring assembly shown in Figs. 2 and 3.

In the gas turbine engine shown in Fig. 1 air is drawn into an inlet 10 by an axial flow compressor 11 and discharged at high pressure from the compressor into a combustion system 12. The combustion system consists of a plurality of chambers into which fuel is introduced and burned in the compressed air, so that the products of combustion are discharged at high velocity and high temperature through a nozzle box 13 into a turbine generally indicated by reference numeral 14. The turbine provides the power to drive the compressor 11 through a shaft 15, the exhaust from the turbine being discharged through a tail cone 16 to provide a propulsive thrust.

The turbine 14 consists of a rotor disc 17 carrying on its peripheral rim a plurality of radially disposed blades 18. The turbine revolves within a stator shroud ring assembly generally indicated by reference numeral 19.

As shown in Fig. 2 an outer shroud ring 20 has front and rear outwardly directed flanges 20a and 20b bolted to the nozzle box 13 and tail cone 16 respectively. The outer shroud ring has an inwardly directed flange or web 20c at its front end, and at its rear end an inwardly extending annular plate or web 21 is bolted with the tail cone to the flange 20b. The outer shroud ring 20 is provided with circumferentially spaced apart holes 20d into which are fitted radially disposed bolt guiding sleeves 22 having portions 22a protruding from the outer side of the outer shroud ring. Locknuts 23 at the inner side of the outer shroud ring securely hold the bolt guiding sleeves 22 in position and also act as supports for retaining plates 24 which press insulation 25 against the inner face of the outer shroud ring 20. The retaining plates 24 are formed with integral locking tabs 26 which are connected by means of wire 27 to the locknuts 23 in order to prevent loosening due to vibration.

An inner shroud ring concentric with the outer shroud ring and spaced inwardly therefrom consists of a plurality of arcuate segments 28 supported in end-to-end relationship by T-bolts 29 the stems of which extend slidably through the sleeves 22. As seen in Figs. 3 and 4, the heads of the T-bolts are of H section, and strengthening plates 28a welded to the shroud segments 28 form channels 28b at the ends of the segments engageable with the flanges of the H section and forming seals therewith. The heads of the T-bolts bridge together adjacent ends of adjacent segments 28 so that the inner shroud ring is continuous. The strengthening plates 28a are longitudinally and transversely dished as at 28c for rigidity, and have side flanges 28d in frictional engagement with the webs 20c and 21. Thus an insulating space 30 is provided between the inner and outer shroud rings.

The outer threaded end of each T-bolt 29 is in threaded engagement with a castellated adjusting nut 31 which is held within the outwardly protruding portion 22a of the bolt-guiding sleeve 22 by means of a U-clip or key 32. The U-clip passes through tangential slots or grooves 33 in the portion 22a and fits within a circumferential groove 34 in the nut 31, preventing axial displacement of the nut relative to the sleeve 22 but permitting rotation of the nut 31, thereby allowing the T-bolt to be adjustably moved in an axial direction. Rotation of the nut 31 is however normally prevented by means of a cotter pin 35 passing through the castellations and one of a pair of holes 29a in the end of the T-bolt. Dislocation of the U-clips 32 is prevented by wiring them in pairs as shown at 36 in Fig. 3.

To install the shroud segments 28, the T-bolts 29 are inserted into the sleeves 22 and drawn upwardly only a short distance by the nuts 31 so that the H sections project below the inner edge of the annular web 21. The shroud segments 28 are slid into engagement with the H sections and are then drawn radially outwardly by rotation of the adjusting nuts 31. When the turbine rotor is in position the shroud segments are lowered until contact with the rotor blades is established. The segments are then retracted a predetermined amount to allow for the reduction in running clearance which occurs at operating speed due to thermal expansion, centrifugal force and other operating conditions.

The segmentation of the inner shroud ring eliminates much of the warpage and distortion occurring in conventional shroud rings. Any warpage or distortion that does occur can be substantially eliminated by adjusting one or more of the T-bolts, thus displacing certain segments 28 relative to the others. It is noteworthy that such adjustment can be achieved from outside the outer shroud ring 20 without the necessity of having to dismantle any part of the engine. The invention has been described with reference to the turbine of a gas turbine engine, but it can obviously be applied to the compressor as well.

Another embodiment of the invention which permits positive locking of the adjusting nuts at any angular position is shown in Figs. 5 and 6. In this embodiment the T-bolt 29 passes through a sleeve 22' having an outwardly protruding portion 22a' and held in the outer shroud ring 20 by a nut 23, the nut supporting insulation 25 by means of a retaining plate 24. The nut and retaining plate are locked by a tab 37 having a recess 37a which receives a pressed-out ear 26 of the retaining plate and having a pair of ears 37b which can be bent down, as shown in Fig. 5, to prevent the nut from turning.

An adjusting nut 31' threadably engages the upper end of the bolt 29 and has a slotted frusto-conical lower end portion 31a' which, with a conical recess 22b' in the end of the protruding portion 22a', forms a collet type fastening, a nut 38 threadably mounted on the outside of the portion 22a' being provided to lock the elements 31a', 22a' of the fastening together to secure the bolt 29 in any desired axial position. The nut 38 may be held against turning by wiring it, as as 39, to a tab 40a on a member 40 that is held against the outer shroud ring by the sleeve 22'. Also the nut 31' and bolt 29 may be held against relative rotation by a cotter pin 35 passing between castellations on the nut and through one of the holes 29a in the bolt.

The invention has been described as applied to a shroud ring construction, but could also be used for supporting stator blades in a compressor or turbine. It will be understood that the forms of the invention herein shown and described are to be taken as preferred examples of the same and that various changes in the shape, size and arrangement of the parts may be resorted to without departing from the spirit of the invention or the scope of the subjoined claims.

What we claim as our invention is:

1. In a rotary machine, a stator ring assembly comprising an outer ring having a plurality of circumferentially spaced apart radial apertures, radially disposed sleeves secured in the apertures, an inner ring spaced radially inwardly from the inner side of the outer ring, the inner ring comprising a plurality of segments movable radially relative to one another, a plurality of radially disposed bolts having heads connecting adjacent segments and securely supporting the segments of the inner ring in spaced relationship to the outer ring, the bolts extending slidably through the sleeves in the outer ring, nuts rotatably mounted on the sleeves at the outer side of the outer ring, the nuts threadably engaging the bolts whereby rotation of the nuts causes radial movement of the bolts in the sleeves and radial displacement of the segments supported by the bolts, means on the sleeves for securing each nut in the same radial position relative to the outer ring for different radial positions of the bolts and segments, and nut engaging means for locking the nuts against such rotation.

2. In a rotary machine, a stator ring assembly comprising an outer ring having a plurality of circumferentially spaced apart radial apertures, radially disposed sleeves secured in the apertures, the sleeves having portions protruding from the outer side of the outer ring, an inner ring spaced radially inwardly from the inner side of the outer ring, the inner ring comprising a plurality of segments movable radially relative to one another, a plurality of radially disposed bolts having heads connecting adjacent segments and securely supporting the segments of the inner ring in spaced relationship to the outer ring, the bolts extending slidably through the sleeves in the outer ring, nuts rotatably mounted on the protruding portions of the sleeves and threadably engaging the bolts whereby rotation of the nuts causes radial movement of the bolts in the sleeves and radial displacement of the segments supported by the bolts, each nut and protruding portion forming the elements of a collet type fastening, a further nut being threadably mounted on each protruding portion for locking said elements together thus securing each bolt engaging nut in the same radial position relative to the outer ring for different radial positions of the bolts and segments.

3. In a rotary machine, a stator ring assembly comprising an outer ring having a plurality of circumferentially spaced apart radial apertures, radially disposed sleeves secured in the apertures, the sleeves having portions protruding from the outer side of the outer ring, an inner ring spaced radially inwardly from the inner side of the outer ring, the inner ring comprising a plurality of segments radially movable relative to one another, a plurality of radially disposed bolts having heads connecting adjacent segments and securely supporting the segments of the inner ring in spaced relationship to the outer ring, the bolts extending slidably through the sleeves in the outer ring, nuts at the outer side of the outer ring having peripheral grooves aligned with grooves in the protruding portions of the sleeves, means in said grooves keying the nuts to the protruding portions for preventing radial displacement of the nuts while permitting rotation thereof, the nuts threadably engaging the bolts whereby rotation of the nuts causes radial movement of the bolts in the sleeves and radial displacement of the segments supported by the bolts, and means for locking the nuts to the bolts.

4. In a rotary machine, a stator ring assembly comprising an outer ring, an inner ring spaced radially inwardly from the inner side of the outer ring, the inner ring comprising a plurality of segments radially movable relative to one another, a plurality of radially disposed T-bolts having heads interlocked with adjacent ends of adjacent segments for bridging together and supporting said segments securely in spaced relationship to the outer ring and having stems protruding through the outer ring, and means on the outer side of the outer ring engageable with said stems for adjustably fixing the radial positions of the T-bolts and hence of the segments relative to the outer ring.

5. In a rotary machine having a blade-supporting rotor and stator, a stator ring assembly surrounding the rotor and comprising an outer ring having a plurality of circumferentially spaced apart radial apertures, radially disposed sleeves secured in the apertures, the sleeves having portions protruding from the outer side of the outer ring, an inner ring spaced radially inwardly from the inner side of the outer ring, the inner ring comprising a plurality of segments arranged in end-to-end relationship and radially movable relative to one another, a pair of annular webs extending radially inwardly from the edges of the outer ring and with which the segments of the inner ring are in frictional engagement, a plurality of radially disposed T-bolts having heads interlocked with adjacent ends of adjacent segments for bridging together and supporting said segments securely in spaced relationship to the outer ring and having stems extending slidably through the sleeves in the outer ring, nuts rotatably mounted on the protruding portions of the sleeves and threadably engaging the stems of the T-bolts whereby rotation of the nuts causes radial movement of the bolts in the sleeves and radial displacement of the segments supported by the bolts, means on the protruding portions of the sleeves for securing each nut in the same radial position relative to the outer ring for different radial positions of the bolts and segments, and nut engaging means for locking the nuts against such rotation.

6. In a rotary machine, a stator ring assembly comprising an outer ring, an inner ring spaced radially inwardly from the inner side of the outer ring, the inner ring comprising a plurality of segments arranged in end-to-end relationship in the circumferential direction of the inner ring and movable radially relative to one another, and a plurality of supporting means supporting the segments securely in spaced relationship to the outer ring, each supporting means bridging together adjacent ends of adjacent segments so that the inner ring is continuous, and each supporting means being adjustably fixed to the outer ring independently of the others for adjustably fixing the radial positions of the segments relative to one another.

7. In a rotary machine, a stator ring assembly comprising an outer ring, an inner ring within the outer ring, the inner ring comprising a plurality of segments arranged in end-to-end relationship in the circumferential direction of the inner ring and movable radially relative to one another, and a plurality of supporting means supporting the segments securely from the outer ring with a space between the outer ring and the segments, the supporting means bridging together adjacent ends of adjacent segments, each supporting means having adjusting and fastening means for fixing the supporting means adjustably to the outer ring, the adjusting and fastening means being adjustable from outside the outer ring for varying the radial positions of the segments relative to the outer ring and to one another.

8. In a rotary machine, a stator ring assembly as claimed in claim 7, wherein each supporting means comprises a bolt protruding through the outer ring, the adjusting and fastening means comprising a rotatable nut threadably engaging the bolt, means holding the nut on the outer ring against movement radially of the outer ring, and nut engaging means for locking the nut against rotation.

9. In a rotary machine, a stator ring assembly as claimed in claim 7, wherein the segments are arcuate members having channels at their ends, the supporting means having flanges engageable with said channels of the segments to support the segments and bridge the segments together.

References Cited in the file of this patent

UNITED STATES PATENTS

| | | |
|---|---|---|
| 890,635 | Fox | June 16, 1908 |
| 1,304,412 | Toyokawa | May 20, 1919 |
| 1,352,276 | Junggren | Sept. 7, 1920 |
| 2,447,942 | Imbert | Aug. 24, 1948 |
| 2,544,538 | Mahnken | Mar. 6, 1951 |
| 2,622,790 | McLeod | Dec. 23, 1952 |

FOREIGN PATENTS

| | | |
|---|---|---|
| 26,383 | Great Britain | of 1909 |
| 436,567 | Germany | Nov. 4, 1926 |
| 600,057 | Great Britain | Mar. 30, 1948 |
| 679,916 | Great Britain | Sept. 24, 1952 |
| 689,270 | Great Britain | Mar. 25, 1953 |
| 852,789 | Germany | Oct. 20, 1952 |